(12) United States Patent
Gu

(10) Patent No.: US 10,322,932 B2
(45) Date of Patent: Jun. 18, 2019

(54) METHOD AND GENERATOR FOR HYDROGEN PRODUCTION

(71) Applicant: HES ENERGY SYSTEMS PTE. LTD., Singapore (SG)

(72) Inventor: Zhijun Gu, Shanghai (CN)

(73) Assignee: HES Energy Systems Pte. Ltd., Singapore (SG)

( * ) Notice: Subject to any disclaimer, the term of this patent is extended or adjusted under 35 U.S.C. 154(b) by 804 days.

(21) Appl. No.: 14/864,468

(22) Filed: Sep. 24, 2015

(65) Prior Publication Data

US 2016/0023897 A1 Jan. 28, 2016

Related U.S. Application Data

(63) Continuation of application No. PCT/SG2014/000103, filed on Mar. 4, 2014.

(30) Foreign Application Priority Data

Mar. 25, 2013 (SG) .................................. 201302296

(51) Int. Cl.
  *C01B 3/06* (2006.01)
  *H01M 8/065* (2016.01)
  (Continued)

(52) U.S. Cl.
  CPC .......... *C01B 3/065* (2013.01); *H01M 8/04738* (2013.01); *H01M 8/04776* (2013.01);
  (Continued)

(58) Field of Classification Search
  CPC .. H01M 4/04738; H01M 4/0606; C01B 3/065
  (Continued)

(56) References Cited

U.S. PATENT DOCUMENTS

| 3,540,854 A | 11/1970 | Brooke, Jr. et al. |
| 5,702,491 A | 12/1997 | Long et al. |

(Continued)

FOREIGN PATENT DOCUMENTS

| CN | 102130352 | 7/2011 |
| DE | 10219333 | 11/2002 |

(Continued)

OTHER PUBLICATIONS

Zhijun, Gu; Office Action for Singapore Patent Application No. 10201401825U, filed Jan. 2, 2011, dated Jan. 24, 2018, 2 pgs.

(Continued)

*Primary Examiner* — James M Erwin
(74) *Attorney, Agent, or Firm* — Taylor English Duma LLP

(57) ABSTRACT

A hydrogen generator and methods of generating hydrogen are described in which a hydride is hydrolyzed in a reaction chamber in an exothermic reaction by the addition of liquid water to be vaporized in the reaction chamber, and/or the added water is controlled in relation to the hydrogen generated according to a value x defined by equations, which, for a divalent metal, reads:

$$MH_2 + xH_2O \rightarrow (2-x)MO + (x-1)M(OH)_2 + 2H_2,$$

wherein M symbolizing the divalent metal and x is preferred in the interval of 1.2 to 1.3. The equation as well as the values of x depend on the sort of hydride, i.e. whether a 1-, 2-, 3- or 4-valent hydride is applied. The hydrogen generator has a reaction chamber and an operably coupled water storage vessel acting also as condenser for recycled water.

16 Claims, 4 Drawing Sheets

(51) Int. Cl.
  *H01M 8/0606* (2016.01)
  *H01M 8/04701* (2016.01)
  *H01M 8/04746* (2016.01)

(52) U.S. Cl.
  CPC ......... *H01M 8/065* (2013.01); *H01M 8/0606* (2013.01); *C01B 2203/1288* (2013.01); *C01B 2203/169* (2013.01); *C01B 2203/1638* (2013.01); *Y02E 60/362* (2013.01)

(58) Field of Classification Search
  USPC ....................................................... 429/421
  See application file for complete search history.

(56) References Cited

U.S. PATENT DOCUMENTS

| | | | |
|---|---|---|---|
| 6,800,387 | B2 | 10/2004 | Shimada et al. |
| 2004/0009379 | A1 | 1/2004 | Amendola |
| 2005/0238573 | A1 | 10/2005 | Zhang et al. |
| 2006/0225350 | A1 | 10/2006 | Spallone et al. |
| 2009/0104481 | A1 | 4/2009 | Mohring et al. |
| 2012/0195825 | A1 | 8/2012 | Koschany et al. |
| 2013/0004865 | A1* | 1/2013 | Stimits .................. B01J 7/02 429/411 |

FOREIGN PATENT DOCUMENTS

| | | |
|---|---|---|
| JP | 6149241 | 10/1986 |
| JP | 2002128502 | 5/2002 |
| JP | 200999534 | 5/2009 |
| JP | 2009298607 | 12/2009 |
| WO | 2005091765 | 10/2005 |
| WO | 2006091954 | 8/2006 |
| WO | 2008019414 | 2/2008 |
| WO | 2009149459 | 12/2009 |
| WO | 2013190966 | 12/2013 |
| WO | 2014158091 | 10/2014 |

OTHER PUBLICATIONS

Gu, Zhijun; International Preliminary Report on Patentability for PCT/SG2014/000103, filed Mar. 4, 2014, dated Jun. 3, 2015, 15 pgs.
Gu, Zhijun; International Search Report for serial No. PCT/SG2014/000103, filed Mar. 4, 2014, dated May 27, 2014, 4 pgs.
Leardini, F. et al., Reaction pathways for hydrogen desorption from magnesium hydride/hydroxide composites: bulk and interface effects, Phys. Chem. Chem. Phys., Nov. 16, 2009, vol. 12, No. 3, p. 572-577, DOI:10, 1039/B912964B.
Microfilm of the specification and drawings annexed to the written application of Japanese Utility Model Application No. 12499/1985 (Laid-open No. 130124/1986) (Furointo Sangyo K.K.) Aug. 14, 1986, entire document (No Family).
HES Energy Systems Pte. Ltd.; European Search Report for serial No. EP14776326.2, filed Mar. 4, 2014, dated Mar. 28, 2016, 8 pgs.

* cited by examiner

METHOD AND GENERATOR FOR HYDROGEN PRODUCTION

REFERENCE TO RELATED APPLICATIONS

This application is a continuation of International Application No. PCT/SG2014/000103, filed Mar. 4, 2014, which claims priority to Singapore Application No. 201302296-7, filed Mar. 25, 2013, both of which are hereby specifically incorporated by reference herein in their entireties.

FIELD OF THE INVENTION

The invention relates to a method of generating hydrogen from a hydride being hydrolysed in a reaction chamber in an exothermic reaction by the addition of water and to a hydrogen generator for performing this method comprising a reaction chamber, a water supply inlet into the reaction chamber and a hydrogen outlet from the reaction chamber.

BACKGROUND OF THE INVENTION

It is known that hydrogen can be generated by hydrolysis of a hydride reacting with water, the hydride being for example a metal hydride or a metal borohydride.

Hydrogen generators can be useful for supplying fuel cells or hydrogen combustion engines with the necessary hydrogen. Generating the hydrogen by a chemical reaction as stated above enables relatively compact and safe generators if compared with hydrogen tanks under high pressure. It is necessary to have some control of the hydrogen generation dependent on the demand of the consuming device, respectively on the effective power demand of the load, by a system which itself should be simple and tightly arranged.

From GB 970420, a system is known that produces hydrogen from an exothermic reaction of magnesium hydride with water, wherein the pressure of the hydrogen is sensed to control the operation of a pump, defining the water supply rate. The hydrogen powers a fuel cell which, as a by-product, produces waste water that, according to this prior art, is used to feed the hydrogen production in the reactor.

From US 2008/0075987 A1, another hydrogen generator as stated above is known which also is controlled on demand by controlling the amount of steam injected into the reaction chamber. The amount of steam reacting with the magnesium hydride is proportional to the amount of hydrogen gas generated. For start-up, electric heaters in some sort of boiler are used for heating the water to vaporize before it enters the reaction chamber. After start-up the water is vaporized in the boiler by heat recovered from the exothermic reaction in the reaction chamber; the boiler could be provided as an integral component of the reaction chamber.

In the prior art, there is the problem of controlling the water supply rate with reference to the different parameters and of system complexity.

SUMMARY

It is an object of the invention to provide a method and an apparatus for generating hydrogen in terms of optimization of reaction controlling.

To attain this object, according to a first aspect of the invention, the water, by its water supply rate, is supplied as liquid to be vaporized in the reaction chamber, i.e. after a starting phase the liquid water entering the reaction chamber is vaporized instantly by the heat originated by the reaction, and an external boiler is avoided.

According to a second aspect of the invention, the hydride which can be the hydride of a 1-valent metal, e.g. lithium hydride, or a 2-valent metal, e.g. magnesium hydride, or a 3-valent metal, e.g. aluminum hydride, or a 4-valent metal, e.g. titanium (IV) hydride, a stoichiometric factor x in the following equations shall be controlled within the below mentioned intervals by adjusting the reaction conditions, in particular the water supply rate, in relation to the hydrogen generated, the value x being defined by the following four equations:

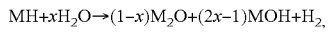
$$MH + xH_2O \rightarrow (1-x)M_2O + (2x-1)MOH + H_2,$$

M symbolizing a 1-valent metal, x being in the interval of 0.51 to 0.9;

$$MH_2 + xH_2O \rightarrow (2-x)MO + (x-1)M(OH)_2 + 2H_2,$$

M symbolizing a divalent metal, x being in the interval of 1.02 to 1.8;

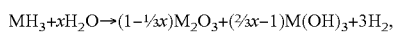
$$MH_3 + xH_2O \rightarrow (1-\tfrac{1}{3}x)M_2O_3 + (\tfrac{2}{3}x-1)M(OH)_3 + 3H_2,$$

M symbolizing a 3-valent metal, x being in the interval of 1.5 to 3;

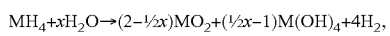
$$MH_4 + xH_2O \rightarrow (2-\tfrac{1}{2}x)MO_2 + (\tfrac{1}{2}x-1)M(OH)_4 + 4H_2,$$

M symbolizing a 4-valent metal, x being in the interval of 2.04 to 3.6, divalent metal M and particularly magnesium being preferred.

The solid reaction products may be formed as two discrete substances or as one substance having the atomic ratios corresponding to the sum of the oxide and the hydroxide product.

The stoichiometric factor x defines the water consumption for a given quantity of generated hydrogen. As can be seen from the equation, the higher the value x, the lower is the hydrogen yield per unit of supplied water, the hydrogen atoms disappearing in the compound $M(OH)_x$, in the preferred embodiment $M(OH)_2$. The factor x can be looked upon as averaged relative water consumption from the start of the reaction to any desired point in time until completion, or as an interval or a momentary parameter. In this document, if not mentioned differently, x shall be interpreted as average stoichiometric factor of the reaction from the start to the completion. Completion is herewith defined as the reaction status where 90% of the initial amount of hydride is converted.

For the divalent metal hydride, a preferable range of x is in the interval of 1.1 to 1.45, and even more preferably in the interval of 1.2 to 1.3. Especially for applications with critical weight and/or volume of the hydrogen generator, e.g. portable devices or devices to be used in aerial vehicles, a low value of x causes at a given desired hydrogen capacity low weight and volume of the necessary water.

However, as mentioned, x can as well have the meaning of a measurable momentary parameter x(t) which characterizes the quality of the reaction at any given time. x(t) can be straightforwardly calculated from measurements of momentary water supply flow and momentary hydrogen flow. The latter is in good accuracy proportional to the current of the fuel cell and thus is easy to measure. The resulting value and the history of former values indicate whether a correction of the reaction conditions is necessary or not.

Similarly as in the prior art, a preferred hydride is magnesium hydride ($MgH_2$), preferably having the form of a granular material, e.g. a powder, with an average particle size of less than 50 µm and more preferably of not more than 10 µm and a granular packing density between 0.4 g/cm$^3$ and 0.7 g/cm$^3$. Such granular material guarantees sufficient gas permeability for hydrogen and water vapor all through the reaction. The magnesium hydride and the magnesium by-products after the reaction do not expand significantly and remain in the granular form. Therefore the magnesium hydride may be mildly compressed in the reactor chamber in order to achieve larger hydrogen content per volume of the reaction chamber. For the value x being in the preferred range, a potential control mechanism is to set the hydrogen production flow rate to a predefined value not exceeding 9 normal liter (1013 mbar at 0° C.) per kg of still un-reacted MgH$_2$ contained in the reactor and more preferable being less than 3.5 normal liter per kg of MgH$_2$.

The control strategy and the set parameters of the reaction conditions in order to achieve the claimed stoichiometric factor x depend on the type of metal hydride, the reactor design and the balance of plant, the main variable parameter being the water supply rate. The water supply rate is controlled, e.g. through regulating a feeding pump, under consideration of the value x, and by influencing the temperature in the reaction chamber, i.e. if not otherwise mentioned in this document the average temperature all over in the reaction chamber, in dependency of the pressure of the hydrogen generated and/or the water vapour partial pressure in the reaction chamber. The value of x tends towards 1 if the water vapor partial pressure is low and the temperature is high; vice versa x approaches 2 for high water vapor partial pressure and low temperature. The water vapor partial pressure is a main factor which determines the reaction speed and thus the hydrogen output. A useful temperature range for the operation as average temperature in the reaction chamber is 80° C. to 400° C., preferably 220° C. to 350° C.

If the total pressure, i.e. the pressure of hydrogen and water vapor at the hydrogen outlet of the reaction chamber, rises, the value of x approaches 2, which means that more water is necessary for the production of the hydrogen. Rising of the total pressure leads to a higher value of x.

For starting of the reaction or at low hydrogen demand of the consuming device, favourably the reaction chamber is heated up to a starting temperature of 80° C. to 100° C., either electrically by means of resistance wires, or chemically by reacting phosphorous-pent-oxide deposited in the reaction chamber and water in a two-step exothermic reaction comprising a first step of dissolving the phosphorous-pent-oxide to form phosphoric acid and a second step of reacting the phosphoric acid with the metal hydride to form hydrogen and phosphates.

In case of electric pre-heating the electric energy needed is by far less than the electric energy which can be generated by using the hydrogen e.g. in a fuel cell; thus several consequent start-stops can be supported during the process of one completion of the hydride. A chemical heating with phosphorous-pent-oxide allows one time start-up pre-heating only, but doesn't need electricity.

For carrying out the above method, a hydrogen generator is appropriate, comprising the reaction chamber, a water supply inlet into the reaction chamber, and a hydrogen outlet from the reaction chamber, wherein in series with the hydrogen outlet within the reaction chamber a porous material permeable to hydrogen, but not permeable to the hydride is arranged. This porous material, e.g. carbon cloth, glasfibre fleece etc., supports the hydrogen collection and transfer, prevents blocking of outlets of the reaction chamber by the hydride and the escape of some hydride and furthermore provides for at least partial thermal insulation. Advantageously a further porous material in series with the water supply inlet is arranged within the reaction chamber, that is permeable to steam but not permeable to the hydride and preferably also not permeable to liquid. It prevents a blocking of inlets of the reaction chamber and, if impermeable to liquid, prohibits the contact of liquid water with the hydride.

Particularly for hydrogen generators not having a temperature control, it is of advantage if the reaction chamber is surrounded by a non-linear thermal insulation, having a high thermal resistance at low temperature and a low thermal resistance at high temperature, such as vacuum insulation, permeable to thermal radiation. An insulation which causes highly non-linear heat losses means that for magnesium hydride, in the temperature range below 180° C. a good isolation property is given that avoids the necessity of additional heating of the reaction chamber, while in the range above 350° C. inferior insulation property is given, to avoid a self-decomposition of the magnesium hydride.

For portable or aerospace applications, orientation insensitivity is important. This means that the system has to work independently of the direction of gravity relative to the system. The reaction chamber is to be made uncritical in this respect by the hydride being fixed in there; however if the hydrogen generator comprises a water storage vessel, orientation insensitivity is important. To solve this object, the water storage vessel having an inlet connected to the hydrogen outlet of the reaction chamber, a water outlet connected via a pump to the water supply inlet into the reaction chamber and a hydrogen outlet, wherein the water storage vessel has a volume lager than the amount of water to be stored, and the hydrogen outlet is connected to a hydrogen collecting body within the vessel, having a porous wall which is permeable to hydrogen and impermeable to water; and the water outlet is connected to a hose open at its far end and having a weight at its far end, the hose being as long as to reach the most distant area in the vessel. This guarantees that in all orientations of the system the hydrogen collecting body reaches a space free of water and the water outlet always reaches a space under water. The hydrogen collecting body can preferably consist of a tube of porous polytetrafluoroethylene, the tube being formed as a coil penetrating through the complete length of the vessel. The water storage vessel also acts as a condenser; together with hydrogen also residual steam leaves the reaction chamber and is collected in the water storage vessel. The steam condenses there and is added to the water already stored within the vessel.

Also for light and portable applications that require a compact electrical power supply, it is of advantage to connect a fuel cell as consuming device to the hydrogen system. In this case water can as well be recycled from the cathode exhaust gas and/or even anode exhaust gas of this fuel cell. A double recycling system for water from the residual water in the hydrogen flow of the reaction chamber and from the product water of the fuel cell is thereby provided.

Since the maximum favorable hydrogen generation rate depends on the remaining MgH$_2$ in the reactor, at the beginning of the reaction more hydrogen can be generated than towards the end. For supplying a load which is powered by the fuel cell system with sufficient power at any time, the use of a buffer storage is of advantage. This buffer can be a simple gas storage device which however adds substantial volume and weight to the system. More favorable is the use of an electrical buffer, i.e. a rechargeable battery, provided that the dimensioning of the electric power output of the fuel cell is higher than the maximum power demand of the load. The buffer balances the hydrogen flow rate of the hydrogen generator against the power demand of the load and thus the electric power output of the fuel cell.

To achieve a lightweight and compact fuel cell system it is further of advantage to recycle the product water of the fuel cell in the water storage vessel to be applied to the reaction chamber. In the case of the hydride being a divalent metal hydride like magnesium hydride, and the value x is 2 (x=2), two mol of water in the hydrolysis reaction produce two mol of hydrogen which, if used in a fuel cell generate the two mol of water again. So water consumption and water generation of the hydrogen generator in combination with a fuel cell are theoretically balanced. However water cannot be recovered fully from the fuel cell because water vapor leaves the cell with the reactant flows, in particular the air flow, but also with the hydrogen flow, if a hydrogen purge mechanism is applied. Therefore in practice typically only 60%-70% of the water produced by the fuel cell can be recovered for the hydrogen generator. Thus, if water balanced operation and thus high system energy density is desired, according to the invention control of x to the preferred values is carried out.

For easy handling of the hydrogen generator as well as safe and fast recharging, the reaction chamber or additionally the water storage vessel are designed as replaceable cartridge, recyclable or disposable.

To ensure the operational capability of the hydrogen generator in a wide temperature range, a requirement e.g. for military aerospace applications, an anti-freeze is added to the water within the water storage vessel. The applied additive is selected as not to block the reactor and not to cause severe side reactions within the reactor, and furthermore is not to emit substances which could poison the fuel cell.

BRIEF DESCRIPTION OF THE DRAWINGS

The foregoing and further objects, features and advantages of the present invention will become apparent from the following description of a preferred embodiment with reference to the accompanying schematic drawings.

DETAILED DESCRIPTION

Figure 1:
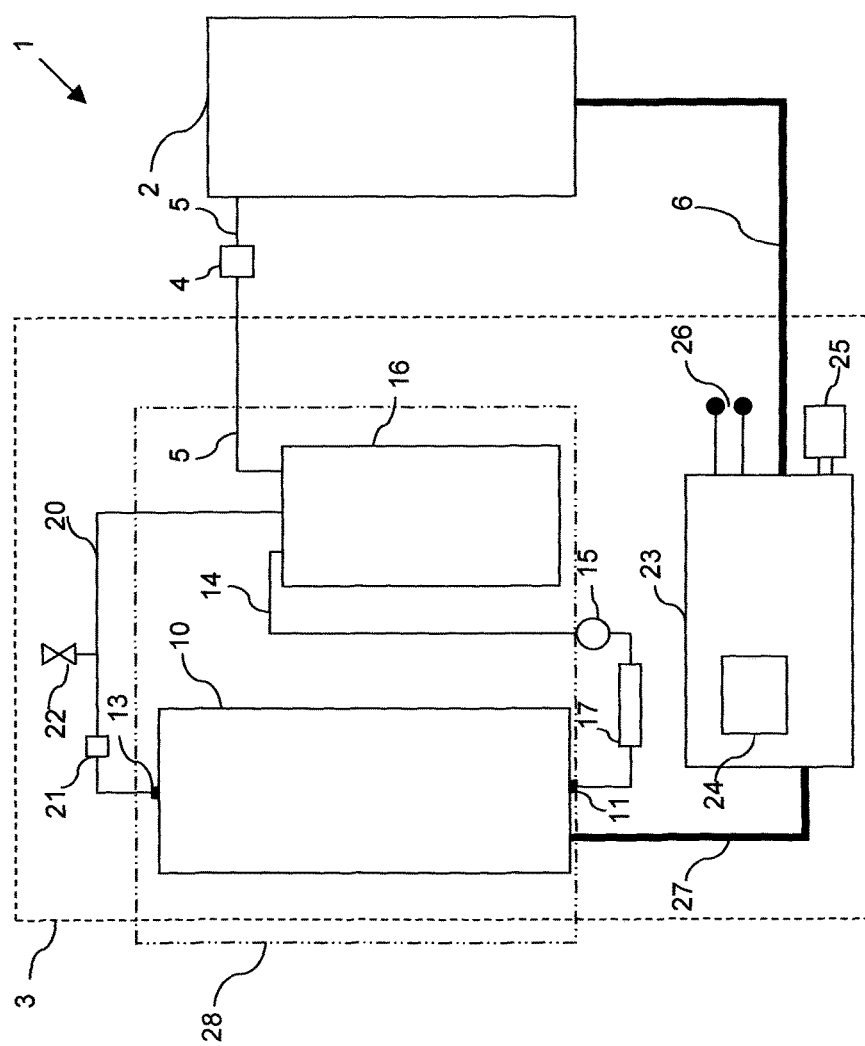
FIG. 1 shows a fuel cell system being supplied with hydrogen from a hydrogen generator according to the invention.

FIG. 1 shows a fuel cell system 1 comprising a fuel cell 2 and a hydrogen generator 3. The fuel cell 2 is coupled to the hydrogen generator 3 via a pressure reduction valve 4 inserted into a hydrogen outlet 5 and via a control and electric output cable 6.

In the hydrogen generator 3 the main component is a reaction chamber 10, comprising a water supply inlet 11 and a hydrogen outlet 13. The water supply inlet is coupled via a water line 14 and a pump 15 to a water storage vessel 16; the water line 14 optionally also contains a water pre-heater 17 using the waste heat from the hydrogen generation reaction. The water storage vessel 16 also is connected via a hydrogen line 20 to the hydrogen outlet 13 of the reaction chamber 10. To the hydrogen line 20, a pressure sensor 21 and an excess pressure valve 22 are connected.

The control and electric output cable 6 is connected to an electronic board 23, carrying a control unit 24, a battery 25, a power output connection 26 to a load and optionally short-circuit switches and further equipment (not shown) usual to control the operation of the fuel cell 2. The control unit 24 has a connection (not shown) to the pressure sensor 21 or to the pressure reduction valve 4, a control cable 27 to the reaction chamber 10 and a further connection (not shown) to the pump 15. At the reaction chamber 10, the control cable 27 is connected to sensors, in particular to temperature sensors (not shown).

To overcome the complex handling of refilling the reaction chamber 10 with the hydride, a replaceable cartridge 28, comprising the reaction chamber 10 and the water storage vessel 16 is provided, having quick connectors (not shown) to all relevant media and electric contacts of the fuel cell system 1. This cartridge 28 is after use professionally recycled or disposed.

The exothermic reaction taking place in the reaction chamber 10 is defined by the following equation:

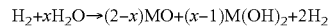

$$H_2 + xH_2O \rightarrow (2-x)MO + (x-1)M(OH)_2 + 2H_2$$

which is a combination of the following two equations known from GB 970,420 and from US 2008/0075987 A1:

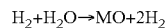

$$H_2 + H_2O \rightarrow MO + 2H_2$$

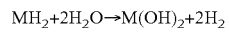

$$MH_2 + 2H_2O \rightarrow M(OH)_2 + 2H_2$$

wherein M symbolizes a divalent metal and the value x determines the relation between the latter two equations and can be described to be a water consumption value. Upon use of a divalent metal hydride, for optimal effectiveness the value x is preferred to be controlled to be from 1.2 to 1.3.

For magnesium hydride $MgH_2$ as divalent metal hydride, liquid water from the water storage vessel 16 is injected via the water supply inlet 11 into the reaction chamber 10, the water supply rate being determined by the pump 15. Hydrogen resulting from the exothermic reaction, and residual water vapour not consumed by the reaction leave the reaction chamber 10 via the hydrogen outlet 13 and are forwarded via the hydrogen line 20 to the water storage vessel 16, which, for the water vapour, acts also as a condenser and thus recycles the water. An additional condenser (not shown) somewhere along line 20 can also be used to condense and recycle residual water. The hydrogen entering the storage vessel 16 leaves this vessel 16 via the hydrogen outlet 5 and is fed to the fuel cell 2.

At fast varying load of fuel cell 2 or toward the end of the hydrogen production, e.g. limited by the amount of fuel, problems can arise in adjusting the required hydrogen flow or hydrogen pressure for the fuel cell 2. This problem can be solved by using a gas buffer volume, as known in the art. This however increases size and weight of the system dramatically. Therefore, for compact systems, an electric buffer, i.e. the battery 25, can be used.

To achieve the value x being in the preferred range of 1.2 to 1.3, the control functions of the fuel cell system 1 is shown hereafter.

Before starting water supply, the reactor shall be heated to at least 80 C, preferred are 100° C. At regular operation, the reactor temperature shall be controlled to be in the range 220° C. to 350° C. A temperature close to 400° C. and above causes substantial self-decomposition of $MgH_2$ which results in uncontrollable hydrogen generation even if the water supply is stopped. This has to be avoided. Too low a temperature, however, favors the formation of $Mg(OH)_2$ and causes a large stoichiometric factor x, and thus, large relative water consumption and consequently, considering the larger water store to be provided, finally a high system weight.

Although the reaction can be quite fast, if the water vapour partial pressure and thus the total pressure are high, it is not favorable for low relative water consumption to approach the limits of reaction rate. The larger the water vapour partial pressure is at given temperature, the larger the value x will be, and vice versa. Since the water vapour partial pressure in the reactor is not easily detectable, it is more convenient to limit the hydrogen production rate to be seen from the hydrogen flow rate in the hydrogen outlet 5. The flow rate should not exceed 9 normal liters (1013 mbar at 0° C.) per kg of still un-reacted $MgH_2$ contained in the reactor and more preferably should be less than 3.5 normal liters per kg of $MgH_2$. The lower the hydrogen flow per unit mass of $MgH_2$ is, the lower is the related relative water consumption value x.

For supplying the load, which is powered by the fuel cell system 1 via the power output connection 26, with the sufficient power at any time, the battery 25 has to function as electric buffer. If the load needs less energy than supplied by the fuel cell 2, especially at the beginning of the hydrogen production, excess energy is stored in the battery 25. Towards the end of the hydrogen production, the hydrogen flow reduces and thus also the power output from the fuel cell 2 should be reduced in order to prevent unfavorable large values of x. Missing power can then be supplied to the load by the battery 25.

Figure 2:
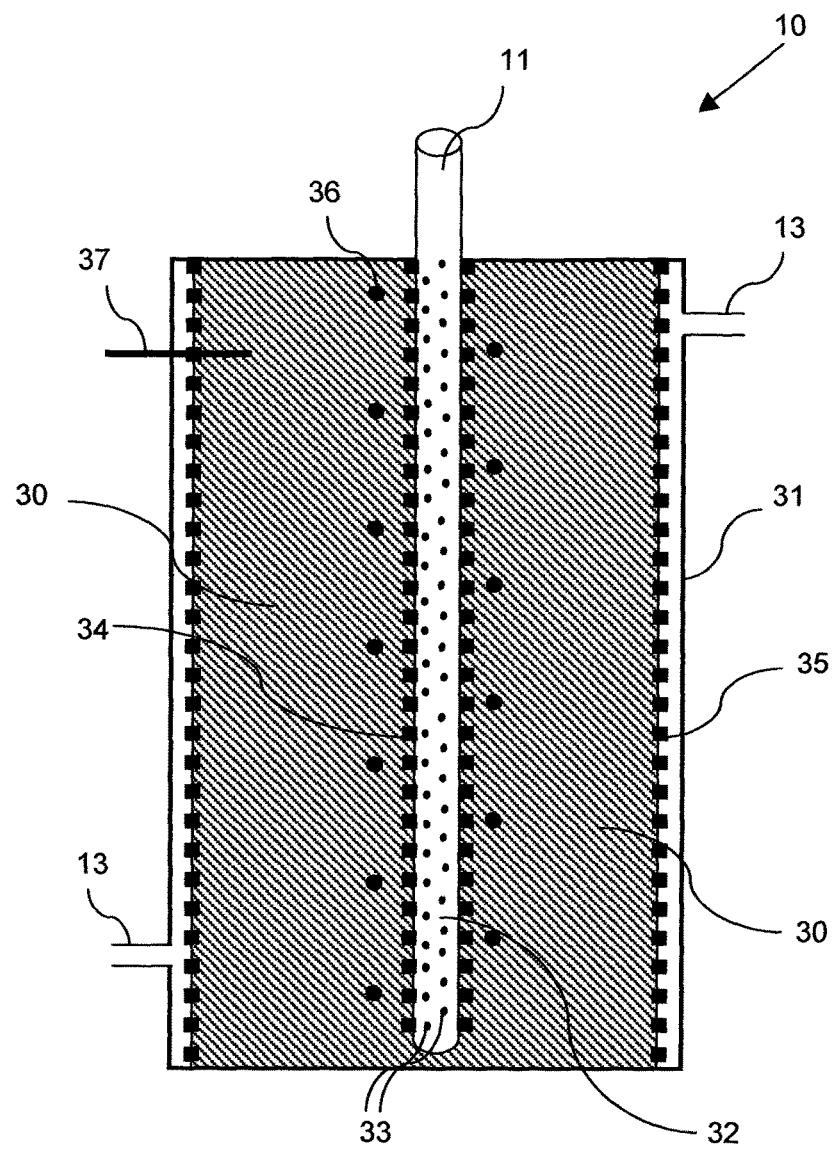
FIG. 2 is a longitudinal section view of a first realisation of a cylindrical reaction chamber of the hydrogen generator.

FIG. 2 is a longitudinal section view of a first realisation of a reaction chamber 10. It has the water supply inlet 11 and the pipe connections (two being shown in the drawing) constituting the hydrogen outlet 13. It comprises $MgH_2$ as granular hydride 30 with a particle size of 5 µm and a density of 0.5 g/cm$^3$, filled in a cylindrical housing 31 through which the inlets and outlets 11 and 13 penetrate. The water supply inlet 11 continues into the housing 31 as an axial evaporation tube 32, perforated here uniformly by a lot of holes 33 (some ones only being shown), wrapped by a coat 34 of porous material permeable to steam but not permeable to the granules of hydride 30 and not permeable to liquid water, such materials being known in the art. A woven, hydrophobic carbon cloth such as is usually used for preparing gas diffusion electrodes for fuel cells having a thickness of 0.35 mm to 0.55 mm is appropriate for this purpose. The coat 34 thus prevents a congestion of the holes 33 by the granular hydride 30 as well as a contact of the hydride 30 with liquid water; the latter avoids the development of slurry which can block the hydrogen outlet 13. The inner wall of the housing 31 is covered by a lining 35, again of a porous material permeable to hydrogen but not permeable to the granules of the hydride 30. The reaction chamber 10 further contains an electric resistor coil 36 allowing heating of the reaction chamber 10. A temperature sensor 37 is connected via the cable 27 (FIG. 1) to the control unit 24.

The liquid water entering the evaporation tube 32 is evaporated in the tube by the heat resulting from the exothermic reaction and in the areas immediately behind the holes 33, the resulting steam reacting with the hydride 30. The hydrogen originated by this reaction penetrates through the hydride 30, which with increasing time contains more and more by-products MO and $M(OH)_2$, and the lining 35 that leads the hydrogen to the pipe connections of the hydrogen outlet 13.

Before start of the reaction, the temperature in the reaction chamber 10 is too low as to convert the liquid water into steam. Therefore, in such cold phases, signalled by the temperature sensor 37, electric heating is carried out by means of the coil 36. This heating also rises the temperature of hydride 30 so as to avoid condensation of steam in the reaction chamber 10. Electric heating will also be favourable in case of low load, thus low hydrogen demand, thus low water supply rate and finally low hydrogen pressure in the hydrogen line 20. Under such conditions, the temperature falls below a threshold value, e.g. 100° C. to 80° C., which is signalled to the control unit 24 which supplies the resistance wire in coil 36 with heating current from the battery 25, thereby keeping the temperature in a useful range.

Figure 3:
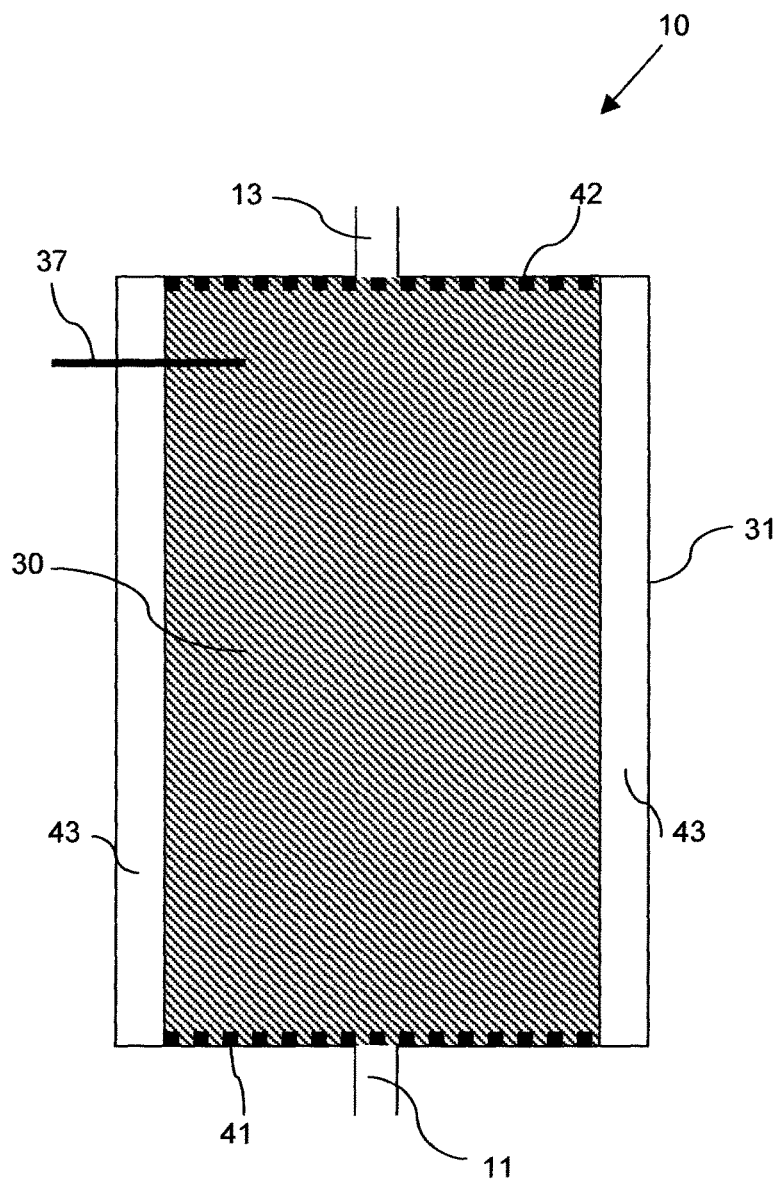
FIG. 3 is a longitudinal section view of a second realisation of a reaction chamber of the hydrogen generator.

FIG. 3 is a longitudinal section view of a second realisation of a reaction chamber 10. The housing 31, which in this example can be cylindrical or block-shaped, is filled with the hydride 30 and is axially penetrated by the steam and the produced hydrogen. It has the water supply inlet 11, the hydrogen outlet 13 and the temperature sensor 37. Corresponding to the coat 34 and the lining 35 of FIG. 2, the present reaction chamber contains a layer of porous material 41 at the water supply inlet 11 and a further layer of porous material 42 at the hydrogen outlet 13. Other than in the embodiment of FIG. 2, there are no heating coils but phosphorous-pent-oxide ($P_2O_5$) is placed in the layer 41. $P_2O_5$ is an oxide of the element phosphor, a hygroscopic powder that, if combined with water, reacts in a strong exothermic reaction to phosphoric acid ($H_3PO_4$). Upon start of the water supply, the heat released by the exothermic reaction is used to pre-heat the reaction chamber 10. In a second step the $H_3PO_4$ reacts with $MgH_2$ to form $H_2$ and phosphates. The phosphates coagulate to particles, but in a tolerable extent because of the small amount of the $P_2O_5$.

The operating temperature, i.e. the average reaction chamber temperature, for achieving a reasonable performance is rather uncritical, ranging for $MgH_2$ from 220° C. to 350° C.; it is noted, that in some specific areas of the reaction chamber the temperature may differ significantly. It may thus be allowable not to control the temperature in a closed loop control, but to design the heat losses of the reaction chamber 10 according to the power demand and profile of the specific application. According to FIG. 3, non-linear heat insulation is provided, having a high thermal resistance at low temperatures and a low thermal resistance at high temperature. The heat loss thereby is small at low reactor temperatures, e.g. 180° C. and rises disproportionally if the reaction chamber temperature rises to 350° C. and higher. Vacuum insulation, mirrored or not mirrored depending on reactor size and average hydrogen flow demand, fulfills this requirement. Since the heat transfer is not governed mainly by conduction, which is proportional to the temperature difference, but by radiation through a vacuum gap, the heat loss can be proportional to the reactor temperature to the fourth power ($T^4$). Thus, in FIG. 3, the housing 31 consists of a double wall cylinder with vacuum 43 in between. If the above described insulation is not sufficient for avoiding excess temperatures, known cooling techniques can be applied.

Further, at critical temperature of the reaction chamber 10 above 350° C. to 380° C. self-decomposition of the $MgH_2$ starts in an uncontrollable way and metallic magnesium is produced ($MgH_2 \rightarrow Mg+H_2$). This reaction is endothermic, and cools down the reaction chamber 10 by itself. The desired production of hydrogen is not controllable until the lower temperature is reached again but the endothermic nature of this reaction provides at least the basic safety feature of preventing thermal runaway.

Figure 4:
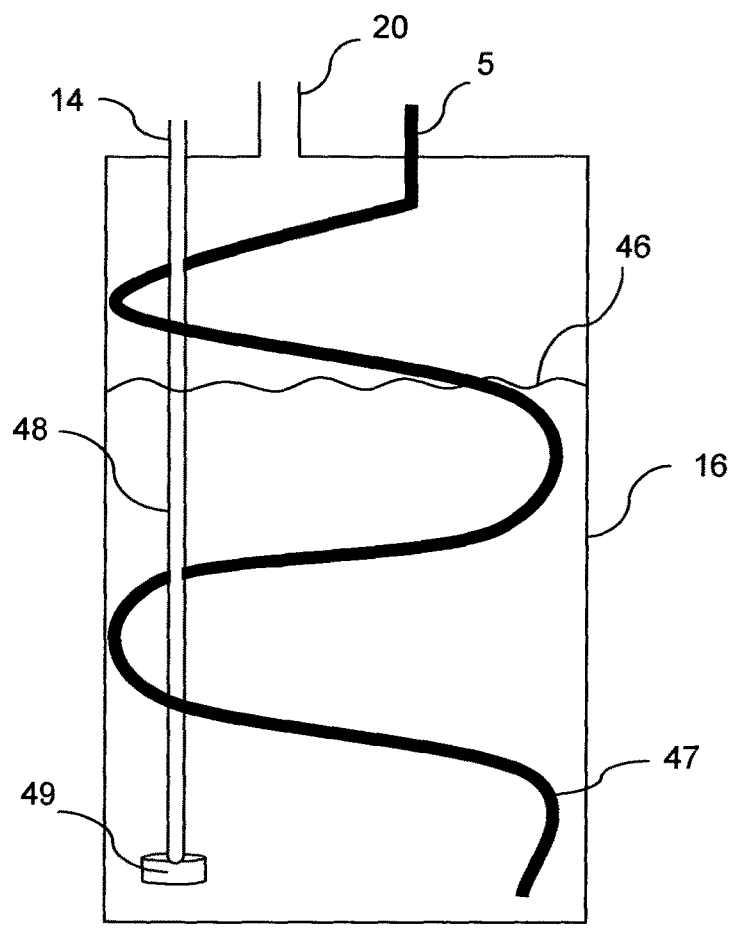
FIG. 4 is a longitudinal section view of a cylindrical water storage vessel of the hydrogen generator.

FIG. 4 is a longitudinal section view of a cylindrical water storage vessel 16, for applications where the orientation has to be insensitive. The vessel 16 is filled with water up to a water level 46 leaving a sufficient air volume above. The water level 46 in the depicted example is approximately ⅔ of the entire vessel 16. The hydrogen outlet 5 continues inside the vessel 16 as tube 47, thus constituting a hydrogen collecting body. The tube 47 consists of expanded, porous and hydrophobic polytetrafluoroethylene (PTFE), that is permeable for gaseous but not for liquid media. The PTFE tube 47 is arranged closed to the walls of the vessel 16, penetrates through the complete volume of the vessel 16 and approximately reaches the bottom of the vessel 16.

The water line 14 continuous inside the vessel 16 as hose 48, i.e. a very flexible plastic tube, with an open end and, at its open end, a high density weight body 49, e.g. a metallic weight, the hose 48 having at least the length of the longitudinal extension of the vessel 16. Thus, in any orientation, the water to be extracted from the vessel 16 is always taken from under the level 46 and the hydrogen to be extracted from the vessel 16 is always taken from above the level 46.

Water can as well be extracted and recycled from the cathode exhaust gas and/or even anode exhaust gas of the fuel cell 2. The water generated by the fuel cell 2 is theoretically enough to replace the water consumed by the hydrogen generator 3, in practice the water losses of the fuel cell 2 make the control of x to values smaller than 1.4 inevitable if water balanced operation and thus high system energy density is required.

REFERENCE LIST 1 fuel cell system
2 fuel cell
3 hydrogen generator
4 pressure reduction valve
5 hydrogen outlet
6 control and electric output cable
10 reaction chamber
11 water supply inlet
13 hydrogen outlet
14 water line
15 pump
16 water storage vessel
17 water pre-heater
20 hydrogen line
21 pressure sensor
22 excess pressure valve
23 electronic board
24 control unit
25 battery
26 power output connection
27 control cable
28 replaceable cartridge
29 granular hydride
30 housing
31 evaporation tube
32 holes
33 coat
34 lining
35 coil
36 temperature sensor
41 layer of porous material
42 layer of porous material
43 vacuum
46 level
47 porous PTFE tube
48 hose
49 high density weight body

The invention claimed is:

1. A hydrogen generator, comprising:
a reaction chamber having an interior, a water supply inlet in communication with the reaction chamber and a hydrogen outlet in communication with the reaction chamber, wherein, within the interior of the reaction chamber, a metal hydride in the form of a granular material is positioned, and wherein, in series with the hydrogen outlet, within the interior of the reaction chamber, a porous material that is permeable to hydrogen but is not permeable to the hydride is positioned;
a water feed pump;
a water line coupled to the water supply inlet and the water feed pump;
a temperature sensor in communication with the interior of the reaction chamber;
a control unit in electrical communication with the water feed pump and the temperature sensor;
a hydrogen line; and
a water storage vessel defining:
a volume larger than an amount of water to be stored therein;
a hydrogen inlet fluidly connected to the hydrogen line;
a water outlet fluidly connected to the water feed pump and the water supply inlet of the reaction chamber; and
a hydrogen outlet;
wherein the metal hydride can be the hydride of a 1-valent metal, or a 2-valent metal, or a 3-valent metal, or a 4-valent metal, a stoichiometric factor x in the following equations being controlled within the below mentioned intervals by adjusting a water supply rate and a temperature of the reaction chamber, in relation to the hydrogen generated, the value x being defined by the following four equations:

$$MH + xH_2O \rightarrow (1-x)M_2O + (2x-1)MOH + H_2,$$

M symbolizing a 1-valent metal, x being in the interval of 0.51 to 0.9, $$MH_2 + xH_2O \rightarrow (2-x)MO + (x-1)M(OH)_2 + 2H_2,$$

M symbolizing a divalent metal, x being in the interval of 1.02 to 1.8, $$MH_3 + xH_2O \rightarrow (1-\tfrac{1}{3}x)M_2O_3 + (\tfrac{2}{3}x-1)M(OH)_3 + 3H_2,$$

M symbolizing a 3-valent metal, x being in the interval of 1.5 to 3, $$MH_4 + xH_2O \rightarrow (2-\tfrac{1}{2}x)MO_2 + (\tfrac{1}{2}x-1)M(OH)_4 + 4H_2,$$

M symbolizing a 4-valent metal, x being in the interval of 2.04 to 3.6.

2. The hydrogen generator of claim 1, wherein the hydrogen line is coupled to the hydrogen outlet of the reaction chamber, the hydrogen generator further comprising a pressure sensor in communication with the hydrogen line, wherein the control unit is in communication with the pressure sensor and wherein the stoichiometric factor x is controlled by adjusting a pressure of the reaction chamber.

3. The hydrogen generator of claim 1, further comprising, in series with the water supply inlet, within the interior of the reaction chamber, a porous material that is permeable to steam but not permeable to the hydride is positioned.

4. The hydrogen generator of claim 1, further comprising a thermal insulation surrounding the reaction chamber, wherein the thermal insulation has a non-linear thermal insulation characteristic with a high thermal resistance at low temperature and a low thermal resistance at high temperature.

5. The hydrogen generator of claim 4, wherein the non-linear thermal insulation characteristic is realized by vacuum insulation, which is permeable to thermal radiation.

6. The hydrogen generator of claim 1, wherein the hydrogen outlet of the water storage vessel is connected to a hydrogen collecting body positioned within the water storage vessel, and wherein the hydrogen collecting body has a porous wall which is permeable to hydrogen and impermeable to liquid water.

7. The hydrogen generator of claim 1, wherein the hydrogen collecting body comprises a tube of porous polytetrafluoroethylene, the tube of porous polytetrafluoroethylene being formed as a coil penetrating through an interior volume of the water storage vessel to allow a part of the formed coil to be positioned above the water level irrespective of the orientation of the water storage vessel.

8. The hydrogen generator of claim 1, wherein the water outlet of the water storage vessel is connected to a hose that is open at its distal end.

9. The hydrogen generator of claim 8, wherein the distal end of the hose has a weight coupled to it, and wherein the hose has an elongate length to reach the most distant portion of the water storage vessel.

10. The hydrogen generator of claim 8, further comprising a fuel cell, wherein the hydrogen generator is connected to the fuel cell for supplying hydrogen to the fuel cell under a load, and wherein the control unit is in electrical communication with the load cell.

11. The hydrogen generator of claim 10, wherein the electric power output of the fuel cell is dimensioned to be higher than the maximum power demand of the load.

12. The hydrogen generator of claim 11, further comprising an electrical buffer that is in electrical communication with the fuel cell.

13. The hydrogen generator of claim 12, characterized in that the fuel cell is fluidly connected to the water storage to feed product water from the fuel cell into the water storage vessel.

14. The hydrogen generator of claim 13, wherein the reaction chamber is formed as a replaceable cartridge.

15. The hydrogen generator of claim 13, wherein the reaction chamber and the operably coupled water storage vessel are formed as a replaceable cartridge.

16. The hydrogen generator of claim 15, wherein the reaction chamber and the operably coupled water storage vessel are integrally formed as a replaceable cartridge.

* * * * *